United States Patent
Goldman et al.

(10) Patent No.: US 10,608,297 B2
(45) Date of Patent: Mar. 31, 2020

(54) SYSTEMS AND METHODS FOR COOLING BATTERIES IN A BATTERY POWERED BLOW DRYER

(71) Applicant: Spur Concepts Inc, San Diego, CA (US)

(72) Inventors: Ryan Goldman, San Diego, CA (US); Jonathan Friedman, San Diego, CA (US); Zachary Rattner, San Diego, CA (US)

(73) Assignee: SPUR CONCEPTS INC, San Diego, CA (US)

( * ) Notice: Subject to any disclaimer, the term of this patent is extended or adjusted under 35 U.S.C. 154(b) by 0 days.

(21) Appl. No.: 15/937,757

(22) Filed: Mar. 27, 2018

(65) Prior Publication Data

US 2018/0233788 A1 Aug. 16, 2018

Related U.S. Application Data

(63) Continuation-in-part of application No. 15/663,735, filed on Jul. 29, 2017, now Pat. No. 10,021,952, and a continuation-in-part of application No. 15/660,601, filed on Jul. 26, 2017, now Pat. No. 10,405,630.

(60) Provisional application No. 62/368,952, filed on Jul. 29, 2016.

(51) Int. Cl.
*H01M 10/613* (2014.01)
*H01M 10/623* (2014.01)
*H01M 2/10* (2006.01)
*H01M 10/6563* (2014.01)
*A45D 20/12* (2006.01)
*A45D 20/10* (2006.01)
*H01M 10/643* (2014.01)
*H01M 10/6235* (2014.01)

(52) U.S. Cl.
CPC ......... *H01M 10/613* (2015.04); *A45D 20/10* (2013.01); *A45D 20/12* (2013.01); *H01M 2/1055* (2013.01); *H01M 10/623* (2015.04); *H01M 10/643* (2015.04); *H01M 10/6563* (2015.04); *H01M 10/6235* (2015.04); *H01M 2200/10* (2013.01); *H01M 2220/30* (2013.01)

(58) Field of Classification Search
CPC ..... A45D 20/10; A45D 20/12; H01M 10/613; H01M 10/643; H01M 10/6563; H01M 10/6235; H01M 2/1055; H01M 2200/10; H01M 2220/30
USPC ............................................. 34/549, 95–100
See application file for complete search history.

(56) References Cited

U.S. PATENT DOCUMENTS

| | | | | | |
|---|---|---|---|---|---|
| 4,586,117 A | * | 4/1986 | Collins | ..................... | F21L 4/00 362/373 |
| 4,903,416 A | * | 2/1990 | Levin | ..................... | A45D 1/02 126/401 |
| 5,097,828 A | * | 3/1992 | Deutsch | ................. | A61F 7/007 604/113 |
| 5,857,262 A | * | 1/1999 | Bonnema | ............... | A45D 20/06 34/97 |

(Continued)

FOREIGN PATENT DOCUMENTS

| GB | 271923 A | * | 5/1927 | ............. | G03B 21/30 |
|---|---|---|---|---|---|
| JP | 2009022173 A | * | 2/2009 | | |

*Primary Examiner* — Stephen M Gravini
(74) *Attorney, Agent, or Firm* — Michael R Shevlin (57) ABSTRACT

A battery powered blow dryer having a novel battery cooling feature to simultaneously cool the batteries and improve hair dryer performance.

19 Claims, 6 Drawing Sheets

(56) References Cited

U.S. PATENT DOCUMENTS

| | | | | |
|---|---|---|---|---|
| 7,716,849 B1* | 5/2010 | Hicks | ............... | D06F 59/06 |
| | | | | 211/182 |
| 7,913,416 B1* | 3/2011 | Scieri | ............... | A45D 20/10 |
| | | | | 34/96 |
| 8,707,969 B2* | 4/2014 | Seng | ............... | A45D 1/28 |
| | | | | 132/211 |
| 9,681,726 B2* | 6/2017 | Moloney | ............... | A45D 20/10 |
| 9,775,740 B2* | 10/2017 | Bly | ............... | A61F 7/0085 |
| 9,808,066 B2* | 11/2017 | Moloney | ............... | A45D 20/10 |
| 10,021,952 B2* | 7/2018 | Goldman | ............... | A45D 20/12 |
| 10,299,558 B2* | 5/2019 | Yifrach | ............... | A45D 20/06 |
| 2006/0248917 A1* | 11/2006 | Urfig | ............... | F24F 5/0017 |
| | | | | 62/420 |
| 2013/0160316 A1* | 6/2013 | Hadden | ............... | A45D 20/00 |
| | | | | 34/96 |
| 2017/0318958 A1* | 11/2017 | Asante | ............... | A47B 19/06 |
| 2018/0233788 A1* | 8/2018 | Goldman | ............... | H01M 10/613 |

* cited by examiner

SYSTEMS AND METHODS FOR COOLING BATTERIES IN A BATTERY POWERED BLOW DRYER

CROSS-REFERENCE TO RELATED APPLICATIONS

This application is a continuation-in-part of U.S. patent application Ser. No. 15/663,735, filed Jul. 29, 2017, and a continuation-in-part of U.S. patent application Ser. No. 15/660,601, filed Jul. 26, 2017, both of which claim the benefit of U.S. Provisional Application No. 62/368,962, filed on Jul. 29, 2016, which are incorporated herein by reference

FIELD

This invention relates to the general field of blow dryers, also known as hair dryers, and specifically toward a unique battery cooling system and apparatus of a battery powered blow dryer delivering heat output.

BACKGROUND

Blow dryers have been around for decades. Typical blow dryers include a heating coil and a rotating fan housed within a protective outer shell. When power is supplied to the device, the heating coil responds by heating the air within the apparatus. The heated air is then forcefully expelled out of the device by means of a rotating fan. This results in accelerating the process of removing moisture absorbed within the hair follicle by rapidly heating the temperature of the hair.

Blow dryers tend to fall in the 1000 W to 2000 W range and typically receives power transmitted through a cord that is plugged into a wall outlet, so there is not an urgent design objective to minimize power consumption or waste heat. But, this power output presents challenges to power from a battery. All batteries have a level of internal electrical resistance/impedance, which generates heat during both charging and discharging. Thus, using batteries to power a heating element and fan also generates heat within the batteries, battery packs, or internal circuitry as they discharge. This heat can shorten the life of the batteries, and may affect the discharge rate or run time of the batteries. Excess heat can cause the safety control systems (part of the "battery management system" or BMS) to shut off the battery.

It would be desirable to develop a battery-operated blow dryer that is capable of cooling to batteries and related circuitry to increase their performance, avoid overheating and safety issues, and/or extend the life of the batteries.

SUMMARY

The present invention provides a battery powered blow dryer product which is configured to simultaneously cool the batteries and improve hair dryer performance.

BRIEF DESCRIPTION OF THE DRAWINGS

The present embodiments may be understood from the following detailed description when read in conjunction with the accompanying figures. It is emphasized that the various features of the figures are not necessarily to scale. On the contrary, the dimensions of the various features may be arbitrarily expanded or reduced for clarity.

DETAILED DESCRIPTION

Embodiments of the invention will now be described with reference to the figures, wherein like numerals reflect like elements throughout. The terminology used in the description presented herein is not intended to be interpreted in any limited or restrictive way, simply because it is being utilized in conjunction with detailed description of certain specific embodiments of the invention. Furthermore, embodiments of the invention may include several novel features, no single one of which is solely responsible for its desirable attributes or which is essential to practicing the invention described herein.

Prior attempts to provide enough heat to dry hair with a battery powered dryer have failed due to the high power consumption inherent in conventional heating elements. The present invention discloses a blow dryer that solves this problem by using a novel cooling system that provides cooling to the batteries and related circuitry. By placing the ventilation holes proximate to the batteries, the novel cooling system takes advantage of the cool air flow to ventilate the batteries. As the air flows around the batteries to cool them, the air is warmed and generates waste heat. Optionally, this waste heat that can be recycled. For example, from a performance standpoint, the excess heat coming off the battery pack could be directed toward the heating element, which boosts the performance of the dryer. Another option may be to use the warmed air from the batteries to warm the handle for the user.

Figure 1:
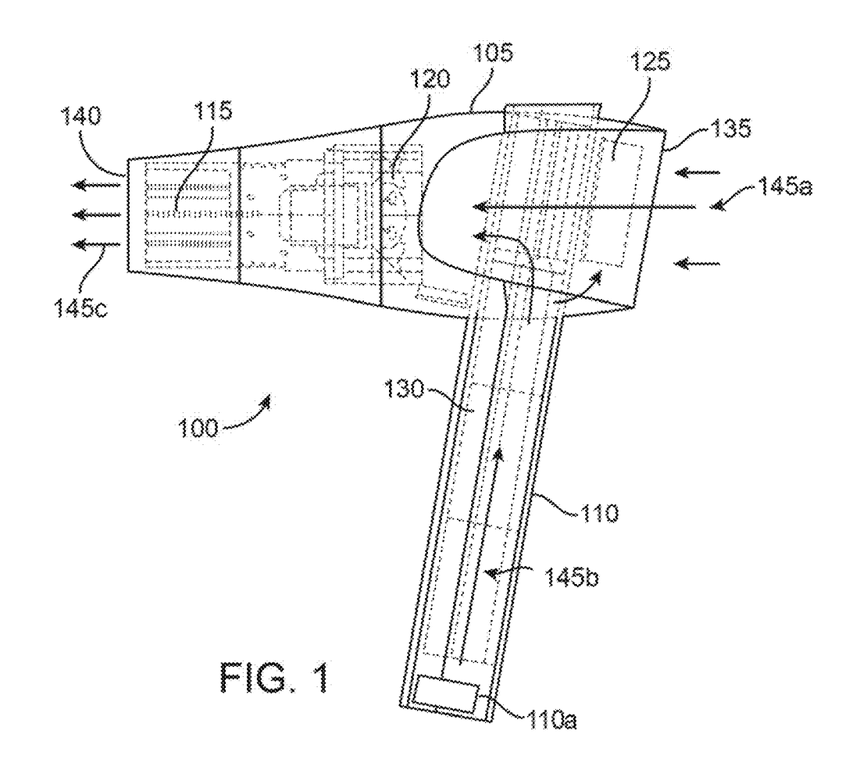
FIG. 1 shows one embodiment of a battery powered blow dryer with battery cooling features.

FIG. 1 shows one embodiment of a battery powered blow dryer 100 having a case 105 with a handle 110, a heating element system 115, a fan 120 positioned proximate the heating element 115, electronics 125 and one or more batteries 130 positioned inside the handle 110 to power the components. The case includes case air flow channel with an air inlet 135 and air outlet 140. In the embodiment shown, the fan draws in air 145a through the inlet 135, the air 145 flows through the case and is blown over/through the heating element to heat, and the heated air 145c exits through the outlet 140.

The handle also includes a handle air flow channel in communication with the case air flow channel, so that air flowing through the handle exits into the case air flow channel. The batteries are positioned within the channel with gaps being formed between the handle 110 and batteries 130 that allows air flow around the batteries. To cool the batteries 130, the handle 110 includes one or more intake vents 110a that allows in air to flow 145b up the channel in the handle over the batteries 130 and gaps between the individual cells. The number of the vents and shape of the vents are designed to promote the flow of air and accommodate the shape of the blow dryer. In the embodiment shown, the fan draws air 145b through inlet 110a that flows around the battery cells, then continues through the case 105 and is blown over the heating element 115. While the air flow 145b is cooling the batteries, the air flow 145b is also being warmed, so the battery warmed air flows to the heating element.

Figure 6:
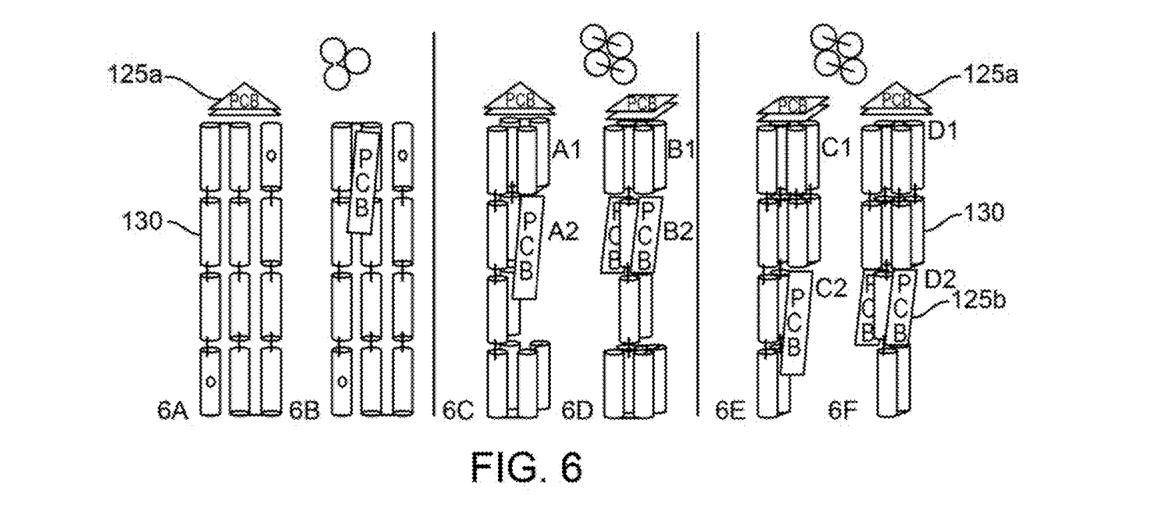
FIGS. 6A-6F show different embodiments for arranging the one or more batteries and electronics.

The number and configuration of the batteries are designed to supply the desired power to the heating element system 115, fan 120 and electronics 125 (see FIG. 6). The batteries may be individually inserted into the handle or may be within a removable battery pack (see FIGS. 7 and 8). The individual cells may have a variety of configurations within the pack as which are described but not limited to the examples detailed in FIG. 6.

The gap between the handle and batteries may also vary in design. The size and shape of the gap between the handle and batteries, and between the battery cells themselves may be designed to promote the cooling of the batteries.

The present invention also may contain a variety of sensors to monitor battery temperatures, detect problems, and provide early warning for intervention. Keeping the batteries cool may also extend the usage time and the life of the battery.

Figure 2:
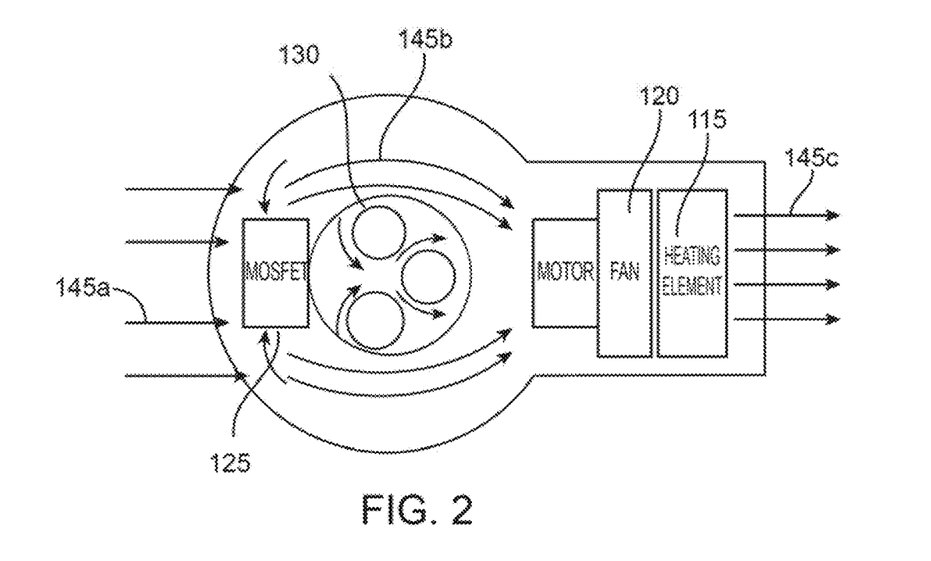
FIG. 2 shows one embodiment having the air flow through and around the battery cells.

FIG. 2 is a schematic showing air flow 145 through the blow dryer 100 during use. In the embodiment shown, the fan draws 120 in air 145a through the inlet 135 and air 145b through inlet 110a, which flows around the battery cells. Then air flow 145a and 145b join and continue through the case 105 and blown over the heating element 115 to heat the air, and the heated air 145c exits through the outlet 140 toward the hair being dried.

Figure 3A:
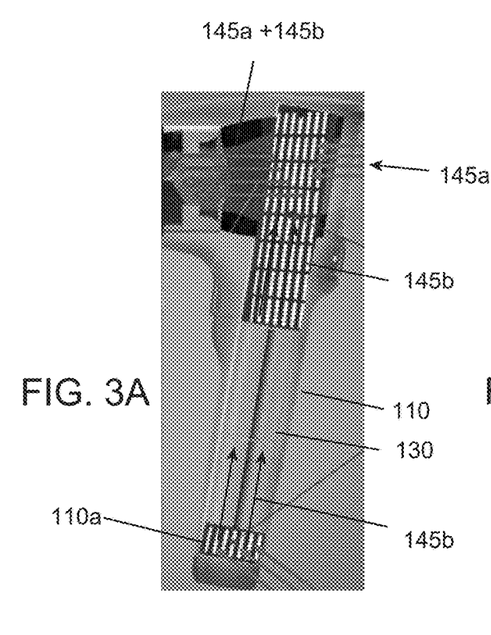
FIG. 3A shows one embodiment of cooling the batteries.

FIG. 3A shows another embodiment in which the air flow 145b is warmed or pre-heated by the batteries prior to reaching the heating element. The fan 120 draws 145a through the inlet 135 and air 145b through the vent 110a. The air 145b flows around the battery cells, cooling them, and then continues through the case. In addition to the fan, the venture effect of the air 145a being pulled by the fan may create a suction or vacuum and draw the air 145b up the handle. If not designed into the blow dryer, this heat would become waste heat—heat that the batteries discharged to achieve, but not adding to the performance of the dryer. By using a design that places the battery pack in line with the dryer's air flow, the battery heat can be drawn off the pack and fed into the heating element.

Figure 3B:
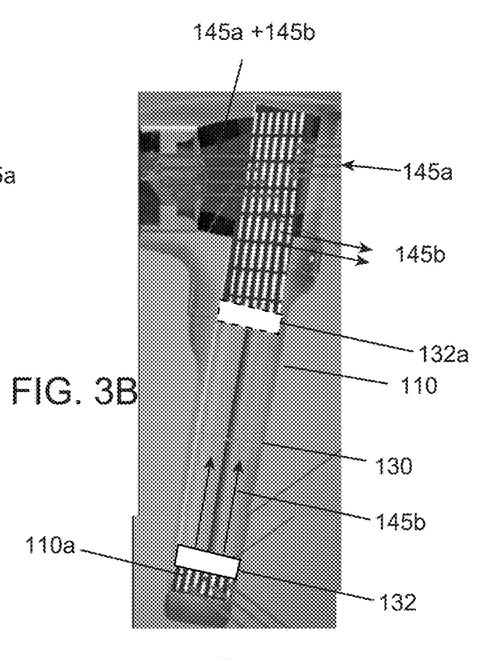
FIG. 3B shows one embodiment of cooling the batteries having a fan in the handle.

FIG. 3B shows another embodiment in which the handle includes a fan 132 that draws in air and blows it through the handle 145b to cool the batteries. In the embodiment shown, the fan 132 is positioned near the bottom of the handle and draws in air 145b through the vent 110a and pushes the air up the handle so that the air 145b flows around the battery cells to cool them. The air flow 145b can then exit out vents at the top of the handle or may join air flow 145a and continue through the case 105 and blown over the heating element 115. In other embodiments, the fan 132a may be positioned above the battery cells in the handle.

Figure 4:
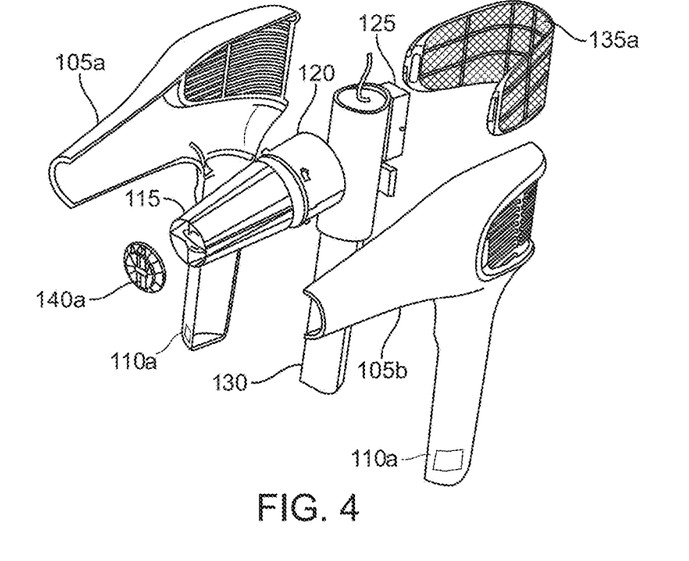
FIG. 4 shows an exploded view of the components of the battery powered blow dryer.

FIG. 4 shows an exploded view of one embodiment of the components of the battery powered blow dryer 100. The heating element 115, fan assembly 120 and electronics 125 are positioned inside the case 105. In the embodiment shown, the case may be made in multiple pieces, such as case 105a and 105b. The inlet 135 may include a screen 135a and the outlet may include a screen or diffuser 140a.

The battery may be integral or may be separate replaceable unit or module that can be charged/upgraded/swapped out separately from the dryer barrel. It is envisioned that different capacity batteries may be used to provide different price points. As a non-limiting example, the battery unit may be composed of lithium ion cells or one or more lithium polymer pouches In some embodiments, the battery may extend into the barrel or air channel to conceal bulk.

In some embodiments, the barrel or air channel may be one-piece (seamless) plastic shell with components inserted from the back.

Figure 5:
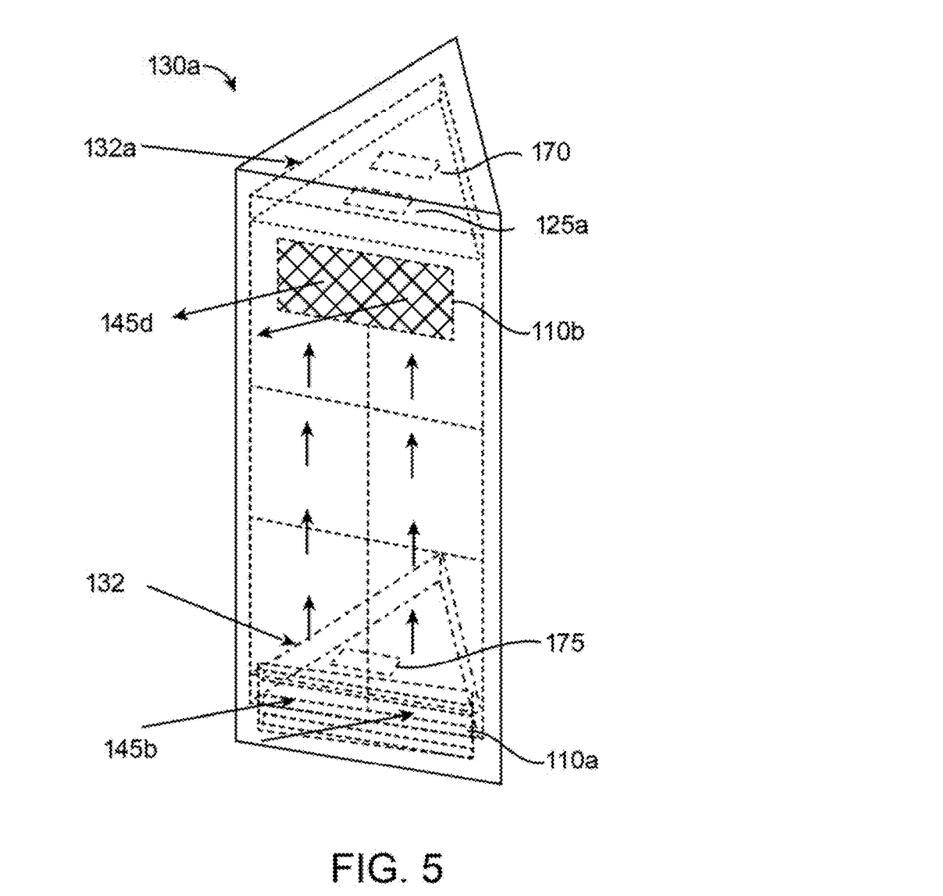
FIG. 5 shows one embodiment of the vented battery pack for cooling.

FIG. 5 shows another embodiment of a battery case 130a that includes an intake vent 110a positioned near one end of the case, such as a bottom end, and an exhaust vent 110b. positioned near the second end of the case, such as a top end. While the vents are shown in the side of the case, the vents may also be in the top and/or bottom of the case. Between batteries 130 are gaps that allow air flow around the batteries. To cool the batteries 130, the one or more intake vents 110a allows in air to flow 145b up the handle in the battery case air flow channel over the batteries 130 and between the individual cells to cool them, and then exits from the outlet vent 110b. The number of the vents and shape of the vents are designed to promote the flow of air given the shape of the blow dryer. When the battery case 130a, is inserted into the handle, the vents 110a and 110b should line up with vents in the handle or case to allow air flow. (see FIG. 12)

In some embodiments, the battery pack 130a may include one or more fans 125 to assist in pulling air 145b into the inlet vent 110a and cooling the batteries. In use, the fan 132 draws in air 145b through the vent 110a and pushes the air up the handle so that the air 145b flows around the battery cells to cool them. The air flow 145b can then exit out vents at the top of the handle or may join air flow 145a and continue through the case 105 and blown over the heating element 115. In other embodiments, the fan 132a may be positioned above the battery cells in the handle.

In some embodiments, the battery pack 130a may also include electrical connectors 170 that connect the batteries to electronics and power the components of the battery operated hair dryer. The bottom of the pack may also include charging electric connectors 175 that may be used to charge and recharge the batteries.

FIGS. 6A-6F show different embodiments for arranging the one or more batteries 130 and electronics 125. As shown in the figures, there may be multiple electronic circuit boards, such as printed circuit boards (PCB). The electronics 125 may include a battery protection feature that monitors the batteries and may shut off the power if the batteries will become damage due to overheating.

Figure 7:
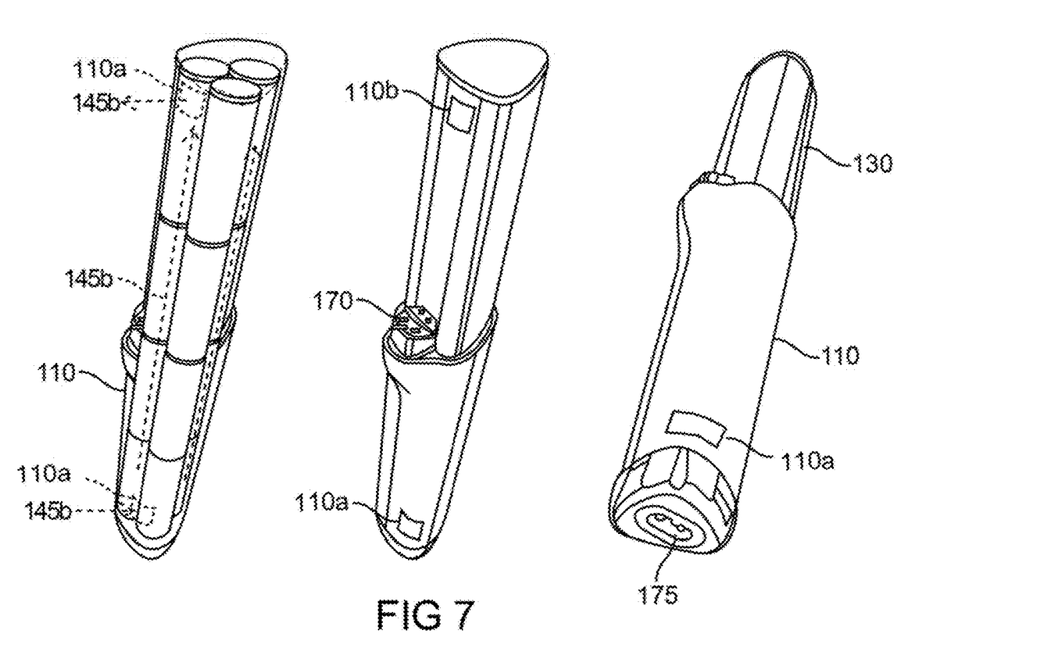
FIG. 7 shows one embodiment of the battery pack/handle.

FIGS. 6A-6F shows many improved the configurations deemed to be feasible given these constraints FIG. 7 shows one embodiment of the battery pack 130 is used a part of the handle 110 that plugs into the casing 105 to form the blow dryer 100. The pack includes electrical connectors 170 that connect the batteries to the electronics 125 and power the components. The bottom of the pack may include charging electric connectors 175 that may be used to charge and recharge the batteries.

The handle 110/battery pack 130 combination includes one or more intake vents 110a that allows air flow 145b to enter the handle 110 and one or more exhaust vents 110b that allows air flow 145b to exit into the case 105.

Figures 8, 9, 10:
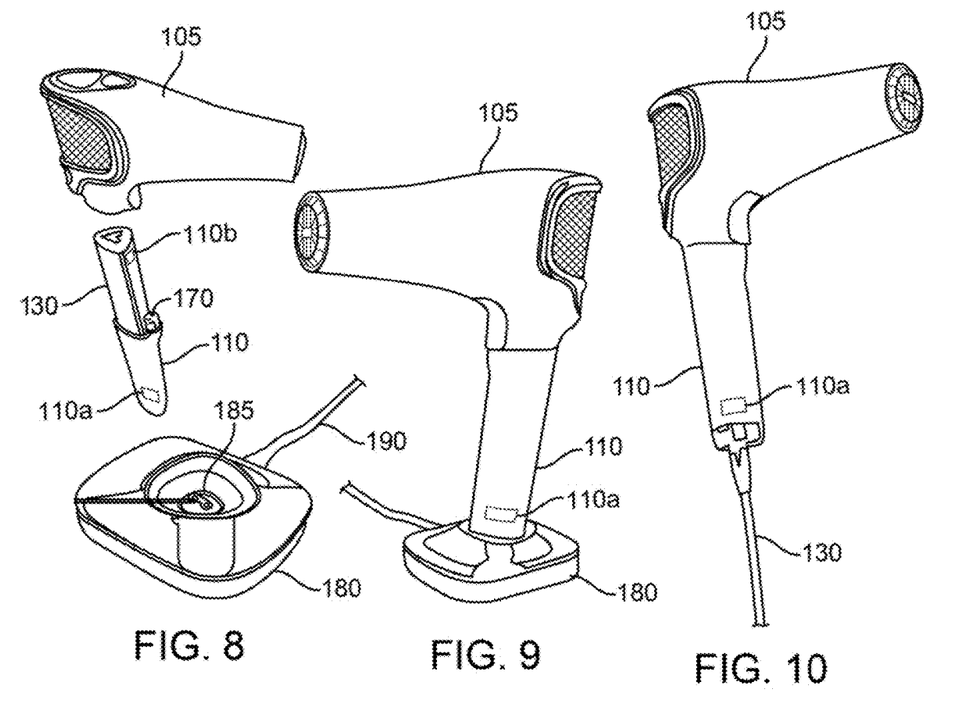
FIG. 8 shows the battery pack/handle.
FIG. 9 shows the battery powered blow dryer.
FIG. 10 shows an embodiment that the power cord plugged directly into connector.

FIG. 8 shows the handle 110/battery pack 130 being assembled with the casing 105. Also shown in the figure is a docking or charging station 180 with charging connectors 185 and power cord 190 that interfaces with connectors 175 to charge the batteries.

FIG. 9 shows the battery powered blow dryer 100 coupled to the docking station 180 to charge or store the unit.

FIG. 10 shows an embodiment that the power cord 190 is plugged directly into connector 175. This allows the blow dryer to be used while the batteries are charging.

In some embodiments, it may be desirable to increase air flow over the batteries to improve battery cooling. This may be done by directing more air flow through the one or more inlets 110a and reducing flow through inlet 135 (see FIG. 1). The inlet may include louvers, flaps or other devices that can be opened or closed to regulate air flow.

Figure 11A:
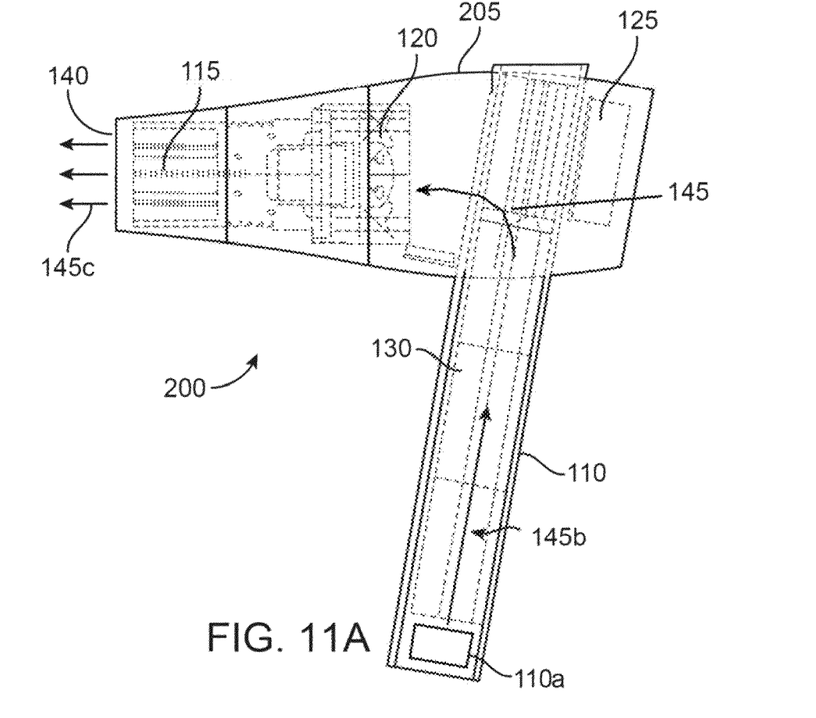
FIG. 11A shows another embodiment of a battery powered blow dryer with battery cooling features.

FIG. 11A shows one embodiment of a battery powered blow dryer 200 for increased battery cooling, that is similar to blow dryer 100, except air inlet 135 has been removed and the only air inlet is in the handle. In the embodiment shown, battery powered blow dryer 200 includes a case 205 with a handle 110, a heating element system 115, a fan 120 positioned proximate the heating element 115, electronics 125 and one or more batteries 130 positioned inside the handle 110 to power the components. The battery powered blow dryer 200 includes air flow channel with one or more air inlets 110a positioned in the handle and an air outlet 140. In the embodiment shown, the fan draws in air 145 through the inlet 110a, the air 145b flows air up the handle 110 cooling the batteries and is blown over/through the heating element in the case 205 to heat, and then the heated air 145c exits through the outlet 140.

Between the handle 110 and batteries 130 may be a gap is formed that allows air flow around the batteries. To cool the batteries 130, the one or more intake vents 110a allows in air to flow 145b up the handle over the batteries 130 and between the individual cells. The number of the vents and shape of the vents are designed to promote the flow of air given the shape of the blow dryer. In the embodiment shown, the fan draws air 145b through inlet 110a that flows around the battery cells, then continues through the case 205 and is blown over the heating element 115.

Figure 11B:
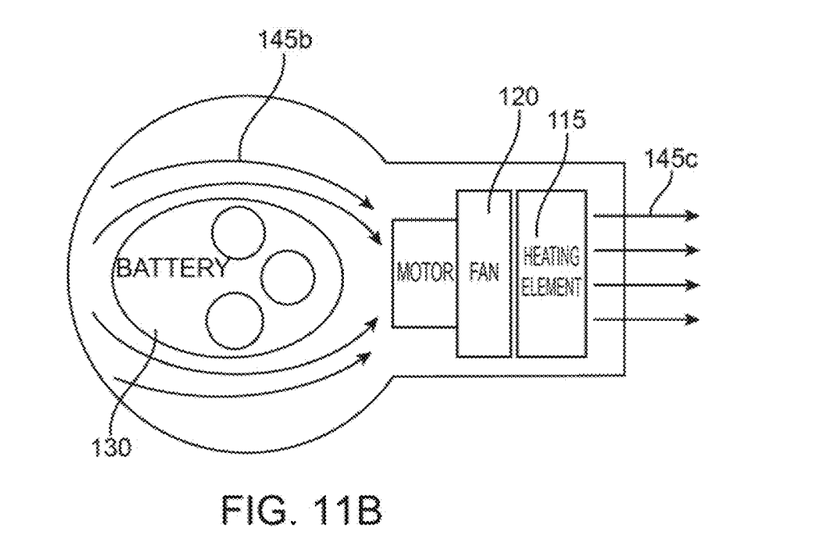
FIG. 11B shows another embodiment having the air flow around the battery cells.

FIG. 11B is a schematic showing air flow 145 through the blow dryer 200 during use. In the embodiment shown, the fan draws in air 145b through inlet 110a, which flows around the battery cells, continues through the case 205 and blown over the heating element 115 to heat the air, and the heated air 145c exits through the outlet 140 toward the hair being dried.

While the embodiments shown use fan 120 for air flow, other embodiments may include additional fans for battery cooling air flow. The fans may be located within the case, within the handle, or may be part of the battery pack.

Figure 12:
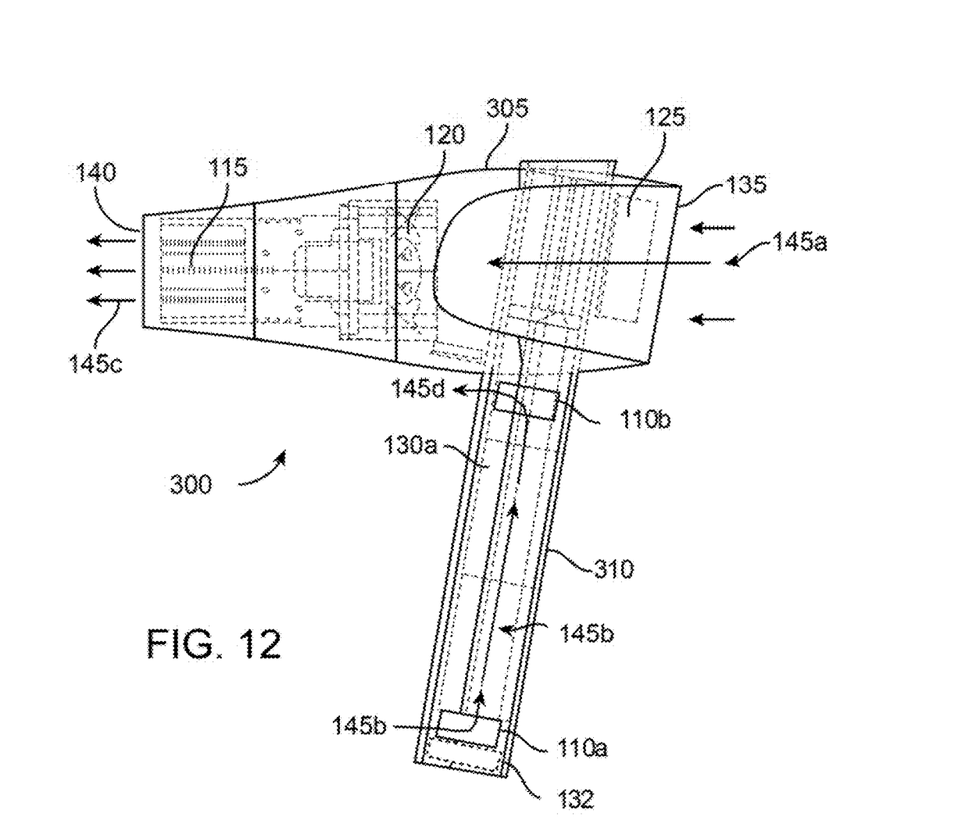
FIG. 12 shows another embodiment of a battery powered blow dryer with battery cooling features.

FIG. 12 shows another embodiment of a battery powered blow dryer 300 with battery cooling feature within the battery case. The blow dryer 300 includes a case 305 with a handle 310, a heating element system 115, a fan 120 positioned proximate the heating element 115, electronics 125 and a battery case 130a with one or more batteries 130 positioned inside the handle 310 to power the components, and a battery fan 132 to draw in the air 145b to cool the batteries. Blow dryer 300 is similar to blow dryer 100, except uses a battery case 130a includes a battery case air inlet 145a, a battery case air outlet 145d, and a handle fan 132 (see FIG. 5).

In the embodiment shown, the battery fan 132 draws in air 145b through the battery case inlet 110a, the air 145b flows air up the handle 110 cooling the batteries, and then the heated air 145d exits through the battery case outlet 110d. In this configuration, airflow 145b enters and exits the handle, and does not go into the case to mix with case airflow 145a.

The battery powered blow dryer 300 may further include electronics 125a that control the operation of the battery fan 132. In some embodiments, the battery fan 132 runs at the same time as fan 120. In other embodiments, battery fan 132 only runs when the batteries need cooling, or to keep the batteries at the optimum operating temperature. The energy usage is reduced resulting in power savings and enables a more efficient design.

While various embodiments of the disclosed technology have been described above, it should be understood that they have been presented by way of example only, and not of limitation. Likewise, the various diagrams may depict an example architectural or other configuration for the disclosed technology, which is done to aid in understanding the features and functionality that may be included in the disclosed technology. The disclosed technology is not restricted to the illustrated example architectures or configurations, but the desired features may be implemented using a variety of alternative architectures and configurations. Indeed, it will be apparent to one of skill in the art how alternative functional, logical or physical partitioning and configurations may be implemented to implement the desired features of the technology disclosed herein. Also, a multitude of different constituent module names other than those depicted herein may be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the disclosed technology is described above in terms of various exemplary embodiments and implementations, it should be understood that the various features, aspects and functionality described in one or more of the individual embodiments are not limited in their applicability to the particular embodiment with which they are described, but instead may be applied, alone or in various combinations, to one or more of the other embodiments of the disclosed technology, whether or not such embodiments are described and whether or not such features are presented as being a part of a described embodiment. Thus, the breadth and scope of the technology disclosed herein should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, may be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives may be implemented without confinement to the illustrated examples. For example, block diagrams and their accompanying description should not be construed as mandating a particular architecture or configuration.

Embodiments presented are particular ways to realize the invention and are not inclusive of all ways possible. Therefore, there may exist embodiments that do not deviate from the spirit and scope of this disclosure as set forth by appended claims, but do not appear here as specific examples. It will be appreciated that a great plurality of alternative versions are possible.

The invention claimed is:

1. A battery-operated hair dryer with battery cooling feature comprising:
   a case having a case air flow channel;
   a handle coupled to the case having a handle air flow channel in communication with the case air flow channel;
   a heating element positioned within the case air flow channel;
   a fan assembly positioned within the case air flow channel, the fan assembly being configured to pull/push in air through the case and handle air flow channels during fan assembly operation;
   at least one battery positioned within the handle air flow channel of the handle, the at least one battery being configured to provide power to the heating element and fan assembly;
   wherein during fan assembly operation, the air flowing in the handle air flow channel contacts and cools the at least one battery.

2. The battery-operated hair dryer of claim 1, wherein the handle air flow channel includes a handle air inlet and a handle air outlet in communication with the case air flow channel.

3. The battery-operated hair dryer of claim 2, wherein during fan assembly operation the air is drawn in the handle air inlet, flows over and cools the at least one battery and flows into the case air flow channel, and exits out of the case air outlet.

4. The battery-operated hair dryer of claim 3, wherein the air flowing over the at least one battery is warmed by the at least one battery, the warmed air exits handle air outlet into the case air flow channel.

5. The battery-operated hair dryer of claim 1, further comprising a handle fan positioned in handle, the handle fan being configured to pull/push in air through the handle air flow channel, wherein during handle fan operation air flows in the handle air flow channel and contacts and cools the at least one battery.

6. The battery-operated hair dryer of claim 1, wherein the at least one battery is a replaceable and/or rechargeable battery.

7. The battery-operated hair dryer of claim 1, wherein the case air flow channel and/or handle air flow channel includes devices to regulate air flow through the case air inlet and/or handle air inlet.

8. The battery-operated hair dryer of claim 1, further comprising a battery protection feature that monitors the least one battery and may shut off the power if the least one battery becomes overheated.

9. The battery-operated hair dryer of claim 1, wherein the case and handle inlets include louvers, flaps or other devices that can be opened or closed to regulate air flow.

10. A battery-operated hair dryer with battery cooling feature comprising:
    a case having a case air flow channel with a case air inlet and a case air outlet;
    a heating element and a fan assembly positioned within the case air flow channel;
    a handle coupled to the case having a handle air flow channel with a handle air inlet and a handle air outlet, the handle air outlet in communication with the case air flow channel between the fan assembly and air inlet of the case;
    at least one battery being positioned within the handle air flow channel configured to provide power to the fan assembly and heating element;
    wherein the fan assembly draws in air through the case air inlet and handle air inlet, the air flows through the case air flow channel to cool the least one battery, the air exiting the case flow channel into the handle air flow channel, the air in the handle flow channel and is blown over/through the heating element to heat the air, and the heated air exits through the case air outlet.

11. The battery-operated hair dryer of claim 10, further comprising a handle fan positioned in handle, the handle fan being configured to pull/push in air through the handle air flow channel, wherein during handle fan operation air flows in the handle air inlet into the handle air flow channel, the air then contacts and cools the at least one battery.

12. The battery-operated hair dryer of claim 10, wherein the air flowing over the at least one battery is warmed by the at least one battery, the warmed air exits handle air outlet into the case air flow channel.

13. The battery-operated hair dryer of claim 10, wherein the at least one battery is a replaceable and/or rechargeable battery.

14. The battery-operated hair dryer of claim 10, wherein the case air flow channel and/or handle air flow channel includes devices to regulate air flow through the case and/or handle air flow channels.

15. A battery-operated hair dryer with battery cooling feature comprising:
    a case having a case air flow channel;
    a heating element positioned within the case air flow channel;
    a fan assembly positioned within the case air flow channel, the fan assembly being configured to pull/push in air through the case and handle air flow channels during fan assembly operation;
    a handle coupled to the case; and a battery case positioned within the handle, the battery case comprising:
  a battery case air flow channel a battery case air inlet and a battery case air outlet;
  at least one battery positioned within the battery case air flow channel,
  an electrical connector configured to connect the least one battery to the heating element and fan assembly;
  a battery fan positioned in the battery case coupled to the battery, the battery fan being configured to pull/push in air through the battery case air flow channel,
  wherein during operation air flows in the battery case air inlet into the battery case air flow channel, the air then contacts and cools the at least one battery, and then exists the battery case air outlet.

16. The battery-operated hair dryer of claim 15, wherein the battery case is configured to be removed and replaced in the handle.

17. The battery-operated hair dryer of claim 15, further comprising battery case electronics configured to control the battery fan operation.

18. The battery-operated hair dryer of claim 17, wherein the battery case electronics is configured to determine when to turn on the battery fan to regulate air flow through the battery case air flow channels.

19. The battery-operated hair dryer of claim 15, wherein the battery case further comprises a charging electric connector that may be used to charge and recharge the batteries.

* * * * *